United States Patent

Teevan et al.

(10) Patent No.: US 8,799,280 B2
(45) Date of Patent: Aug. 5, 2014

(54) PERSONALIZED NAVIGATION USING A SEARCH ENGINE

(75) Inventors: Jaime Teevan, Bellevue, WA (US); Susan T. Dumais, Kirkland, WA (US); Gayathri Ravichandran Geetha, Bellevue, WA (US); Sarah K. Tyler, Dublin, CA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/784,969

(22) Filed: May 21, 2010

(65) Prior Publication Data

US 2011/0289068 A1    Nov. 24, 2011

(51) Int. Cl.
*G06F 17/30* (2006.01)

(52) U.S. Cl.
CPC .............................. *G06F 17/30867* (2013.01)
USPC ........................................................ 707/732

(58) Field of Classification Search
USPC .......................... 707/769, 736, 737, 748, 732
See application file for complete search history.

(56) References Cited

U.S. PATENT DOCUMENTS

| | | | |
|---|---|---|---|
| 6,490,577 B1 | 12/2002 | Anwar | |
| 7,162,473 B2 | 1/2007 | Dumais et al. | |
| 7,203,909 B1 | 4/2007 | Horvitz et al. | |
| 7,328,216 B2 * | 2/2008 | Hofmann et al. | 1/1 |
| 7,590,619 B2 * | 9/2009 | Hurst-Hiller et al. | 1/1 |
| 7,599,914 B2 * | 10/2009 | Patterson | 1/1 |
| 2003/0156141 A1 * | 8/2003 | Good et al. | 345/810 |
| 2004/0221006 A1 * | 11/2004 | Gopalan et al. | 709/203 |
| 2005/0060311 A1 * | 3/2005 | Tong et al. | 707/7 |
| 2006/0224583 A1 | 10/2006 | Fikes et al. | |
| 2007/0022096 A1 * | 1/2007 | Hertz | 707/3 |
| 2007/0208730 A1 | 9/2007 | Agichtein et al. | |
| 2007/0239716 A1 | 10/2007 | Weininger et al. | |
| 2008/0005069 A1 * | 1/2008 | Payne et al. | 707/3 |
| 2008/0270356 A1 * | 10/2008 | Anderson et al. | 707/3 |
| 2008/0281817 A1 * | 11/2008 | White et al. | 707/6 |
| 2009/0100015 A1 * | 4/2009 | Golan | 707/3 |
| 2009/0327270 A1 | 12/2009 | Teevan et al. | |
| 2009/0327913 A1 | 12/2009 | Adar et al. | |
| 2010/0010987 A1 * | 1/2010 | Smyth et al. | 707/5 |
| 2010/0274775 A1 * | 10/2010 | Fontes et al. | 707/706 |

OTHER PUBLICATIONS

Abrams, D., R. Baecker, M. H. Chignell, Information archiving with bookmarks: Personal web space construction and organization, Proc. of the CHI '98 Conf. on Human Factors in Computing Sys's, Apr. 1998, pp. 41-48, Los Angeles, California, USA.

Adar, E., J. Teevan, S. T. Dumais, Large scale analysis of web revisitation patterns, Proc. of the 2008 Conf. on Human Factors in Computing Sys's, Apr. 2008, pp. 1197-1206, Florence, Italy.

(Continued)

*Primary Examiner* — Jorge A Casanova
(74) *Attorney, Agent, or Firm* — Dan Choi; Carole Boelitz; Micky Minhas

(57) ABSTRACT

Personalized navigation for one or more individuals' use of a search engine is provided. Identification of a query submitted to the search engine is performed. If the query is identified to be a personal navigational query, which is a query via which the individuals intend to navigate to a particular site or information object that they have previously viewed, the particular site or information object associated with the query is identified, and results of the search are personalized based on knowledge of the identified site or information object.

17 Claims, 3 Drawing Sheets

(56) References Cited

OTHER PUBLICATIONS

Agichtein, E., E. Brill, S. T. Dumais, Improving web search ranking by incorporating user behavior information, Proc. of the 29th Annual Int'l ACM SIGIR Conf. on Research and Development in Info. Retrieval, Aug. 2006, pp. 19-26, Seattle, Washington, USA.
Agichtein, E., E. Brill, S. T. Dumais, R. Ragno, Learning user interaction models for predicting web search result preferences, Proc. of the 29th Annual Int'l ACM SIGIR Conf. on Research and Development in Info. Retrieval Aug. 2006, pp. 3-10, Seattle, Washington, USA.
Aula, A., N. Jhaveri, M. Käki, Information search and re-access strategies of experienced web users, Proc. of the 14th Int'l Conf. on World Wide Web, May 2005, pp. 583-592, Chiba, Japan.
Beitzel, S. M., E. C. Jensen, A. Chowdhury, D. A. Grossman, O. Frieder, Hourly analysis of a very large topically categorized web query log, Proc. of the 27th Annual Int'l ACM SIGIR Conf. on Research and Development in Info. Retrieval, Jul. 2004, pp. 321-328, Sheffield, UK.
Bruce, H., W. Jones, S. Dumais, Keeping and re-finding information on the web: What do people do and what do they need?, Proc. of the American Society for Info. Science and Tech., Nov. 2004, pp. 129-137, vol. 41, No. 1, Providence, RI.
Capra III, R. G., M. A. Pérez-Quiñones, Using web search engines to find and refind information, IEEE Computer, Oct. 2005, pp. 36-42, vol. 38, No. 10.
Catledge, L. D., J. E. Pitkow, Characterizing browsing strategies in the world-wide web, Computer Networks and ISDN Sys's, Apr. 1995, pp. 1065-1073, vol. 27, No. 6.
Cockburn, A., S. Greenberg, S. Jones, B. McKenzie, M. Moyle, Improving web page revisitation: Analysis, design, and evaluation, Info. Tech. and Society, Winter 2003, vol. 1, No. 3, pp. 159-183.
Dou, Z., R. Song, J.-R. Wen, A large-scale evaluation and analysis of personalized search strategies, Proc. of the 16th Int'l Conf. on World Wide Web, May 2007, pp. 581-590, Banff, Alberta, Canada.
Jones, R., D. C. Fain, Query word deletion prediction, Proc. of the 26th Annual Int'l ACM SIGIR Conf. on Research and Development in Info. Retrieval, Jul. 28-Aug. 1, 2003, pp. 435-436, Toronto, Canada.
Komlodi, A., D. Soergel, G. Marchionini, Search histories for user support in user interfaces, J. of the Am. Soc. for Info. Science and Tech., Apr. 2006, pp. 803-897, vol. 57, No. 6.
Lau, T., E. Horvitz, Patterns of search: Analyzing and modeling Web query refinement, Proc. of the Seventh Int'l Conf. on User Modeling, Jun. 1999, Springer-Verlag New York, Inc. Secaucus, NJ, USA.
Ma, Z., G. Pant, O. R. L. Sheng, Interest-based personalized search, ACM Trans. Inf. Syst., Feb. 2007, vol. 25, No. 1.
Morris, D., M. R. Morris, G. Venolia, SearchBar: A search-centric web history for task resumption and information re-finding, Proc. of the 2008 Conf. on Human Factors in Computing Sys's, Apr. 2008, pp. 1207-1216, Florence, Italy.
Obendorf, H., H. Weinreich, E. Herder, M. Mayer, Web page revisitation revisited: Implications of a long-term click-stream study of browser usage, Proc. of the 2007 Conf. on Human Factors in Computing Sys's, Apr. 28-May 3, 2007, pp. 597-606, San Jose, California, USA.
Piwowarski, B., H. Zaragoza, Predictive user click models based on click-through history, Proc. of the Sixteenth ACM Conf. on Info. and Knowledge Management, Nov. 2007, pp. 175-182, Lisbon, Portugal.
Raghavan, V. V., H. Sever, On the reuse of past optimal queries, Proc. of the 18th Annual Int'l ACM SIGIR Conf. on Research and Development in Info. Retrieval, Jul. 1995, pp. 344-350, Seattle, Washington, USA.
Richardson, M., Learning about the world through long-term query logs, J. of ACM Transactions on the Web, Oct. 2008, vol. 2, No. 4, ACM New York, NY, USA.
Sanderson, M., S. T. Dumais, Examining repetition in user search behavior, Proc. of the 29th European Conf. on IR Research, Advances in Info. Retrieval, Apr. 2007, pp. 597-604, Rome, Italy.
Tauscher, L., S. Greenberg, How people revisit web pages: Empirical findings and implications for the design of history systems, Int. J. Hum.-Comput. Stud., Jul. 1997, vol. 47, No. 1, pp. 97-137.
Tauscher, L., S. Greenberg, Revisitation patterns in world wide web navigation, Conf. Proceedings on Human Factors in Computing Sys's, Mar. 1997, pp. 399-406, Atlanta, Georgia, USA.
Teevan, J., How people recall, recognize, and reuse search results, J. on ACM Trans. on Info. Sys's, Sep. 2008, vol. 26, No. 4, ACM New York, NY, USA.
Teevan, J., E. Adar, R. Jones, M. A. S. Potts, Information re-retrieval: Repeat queries in Yahoo's logs, Proc. of the 30th Annual Int'l ACM SIGIR Conf. on Research and Development in Info. Retrieval, Amsterdam, The Netherlands, Jul. 2007, pp. 151-158.
Teevan, J., S. T. Dumais, E. Horvitz, Personalizing search via automated analysis of interests and activities, Aug. 2005, pp. 449-456, Proc. of the 28th Annual Int'l ACM SIGIR Conf. on Research and Development in Info. Retrieval, Salvador, Brazil.
Teevan, J., S. T. Dumais, D. J. Liebling, to personalize or not to personalize: Modeling queries with variation in user intent, Proc. of the 31st Annual Int'l ACM SIGIR Conf. on Research and Development in Info. Retrieval, Jul. 2008, pp. 163-170, Singapore.
Teevan, J., E. Cutrell, D. Fisher, S. M. Drucker, G. Ramos, P. André, C. Hu, Visual snippets: summarizing web pages for search and revisitation, Proc. of the 27th Int'l Conf. on Human Factors in Computing Systems, Apr. 2009, pp. 2023-2032, Boston, MA, USA.
Tyler, S. K., J. Teevan, Large scale query log analysis of re-finding, Proc. of the Third Int'l Conf. on Web Search and Web Data Mining, Feb. 2010, pp. 191-200, New York, NY, USA.
Wang, P., M. W. Berry, Y. Yang, Mining longitudinal web queries: Trends and patterns, J. of the American Soc. for Info. Science and Tech., Jun. 2003, pp. 743-758, vol. 54, No. 8.
Wedig, S., O. Madani, A large-scale analysis of query logs for assessing personalization opportunities, Proc. of the Twelfth ACM SIGKDD Int'l Conf. on Knowledge Discovery and Data Mining, Aug. 2006, pp. 742-747, Philadelphia, PA, USA.
White, R. W., M. Bilenko, S. Cucerzan, Studying the use of popular destinations to enhance web search interaction, Proc. of the 30th Annual Int'l ACM SIGIR Conf. on Research and Development in Info. Retrieval, Jul. 2007, pp. 159-166, Amsterdam, The Netherlands.

* cited by examiner

| Day | Activity | Query Keywords | Clicked Information Link |
|---|---|---|---|
| Mon. | $Q_1$ | swine flu incidence | |
| | $C_{11}$ | | healthmap.org/swineflu |
| | $C_{12}$ | | www.swine-flu-map-animation.com |
| | $C_{13}$ | | www.cdc.gov/H1N1Flu |
| | $Q_2$ | swine flu deaths | |
| | $Q_3$ | h1n1 | |
| | $C_{31}$ | | en.wikipedia.org/wiki/H1N1 |
| | $C_{32}$ | | www.cdc.gov/H1N1Flu |
| Tues. | $Q_4$ | h1n1 | |
| | $C_{41}$ | | www.cdc.gov/H1N1Flu |
| | $C_{42}$ | | h1n1.nejm.org |
| Wed. | $Q_5$ | swine flu | |
| | $Q_6$ | cdc swine flu | |
| | $C_{61}$ | | www.cdc.gov/H1N1Flu |
| Sat. | $Q_7$ | cdc swine flu | |
| | $C_{71}$ | | www.cdc.gov/H1N1Flu |

FIG. 2

PERSONALIZED NAVIGATION USING A SEARCH ENGINE

BACKGROUND

The Internet is a global data communications system that serves billions of users worldwide. The Internet provides users access to a vast array of information resources and services, including those provided by the World Wide Web, intranet-based enterprises, and the like. Search engines generally provide the ability to search for information on a specific computer or on a network such as the Internet or a private network. Thanks to the ubiquity of personal computers, the Internet and the World Wide Web, users routinely use search engines to locate particular information they are interested in. This information of interest may be either information that the users have visited/viewed before, or new information that the users have not yet visited/viewed. The search results displayed to the users may include a wide variety of different types of information such as web sites or particular web pages therein, documents, images, audio, video, and other types of files and information. Many different search engines exist today which vie for popularity.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Personalized navigation technique embodiments described herein generally provide personalized navigation for individuals using a search engine. In an exemplary embodiment personalized navigation is provided for one or more individuals' use of a search engine. Identification of a query submitted to the search engine is performed. If the query is identified to be a personal navigational query, which is a query via which the individuals intend to navigate to a particular site or information object that they previously viewed, the particular site or information object associated with the query is identified, and results of the search are personalized based on knowledge of the identified site or information object.

DESCRIPTION OF THE DRAWINGS

The specific features, aspects, and advantages of the personalized navigation technique embodiments described herein will become better understood with regard to the following description, appended claims, and accompanying drawings where:

FIG. 2 is a table illustrating an exemplary log of a sequence of queries submitted to the search engine by an individual.

DETAILED DESCRIPTION

Figure 1:
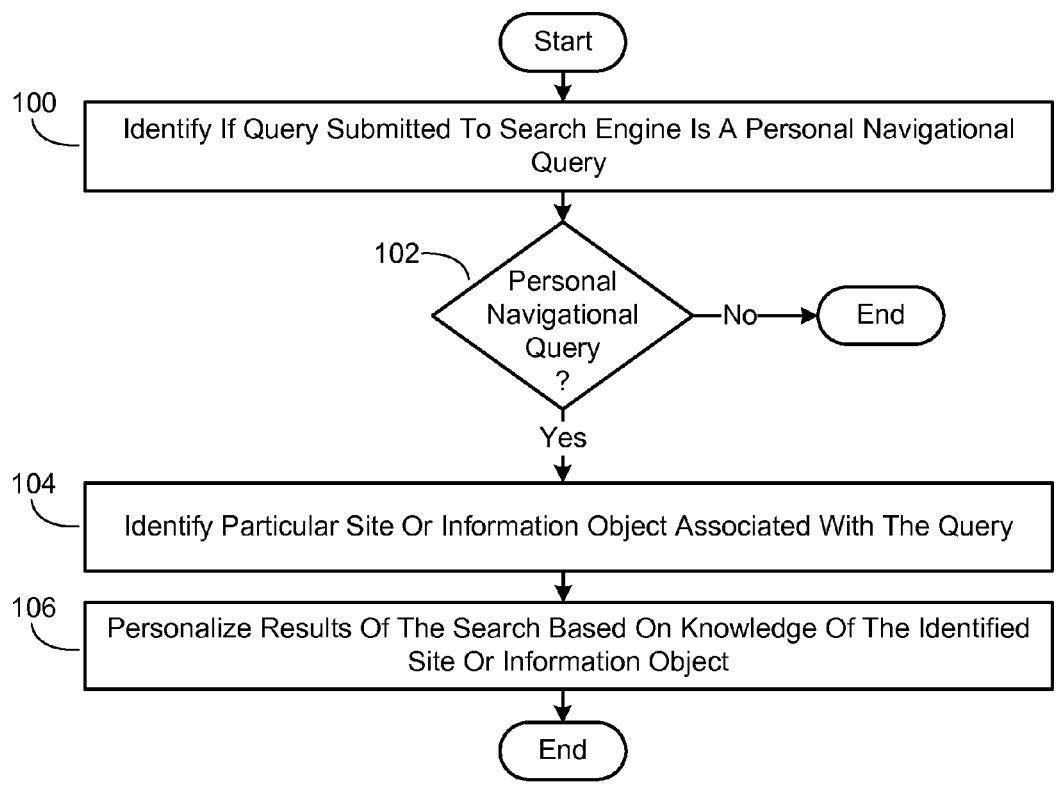
FIG. 1 is a flow diagram illustrating an exemplary embodiment, in simplified form, of a process for providing personalized navigation for individuals using a search engine.

In the following description of personalized navigation technique embodiments reference is made to the accompanying drawings which form a part hereof, and in which are shown, by way of illustration, specific embodiments in which the personalized navigation technique can be practiced. It is understood that other embodiments can be utilized and structural changes can be made without departing from the scope of the personalized navigation technique embodiments described herein.

The term "personal navigational query (PNQ)" is used herein to refer to a query submitted to a search engine by a particular individual (herein also referred to as a user), where via the query the individual intends to navigate to a particular site or information object that they previously visited/viewed. Thus, a PNQ is specific to the individual that submitted it. A query submitted to a search engine which attempts to re-visit information that has previously been located by the search engine is herein referred to as a re-visiting query. It will thus be appreciated that a PNQ is a specific type of re-visiting query. In other words and as will be described in more detail hereafter, personalized navigation is a specific kind of re-visiting behavior by one or more individuals.

The term "information object (IO)" is used herein to refer to a variety of different types of online information. Exemplary types of online information include, but are not limited to, a document, an image, a video clip, an audio clip, or a web page which includes an interrelated collection of one or more of these information types. Another exemplary type of online information is a "search instant answer," which is the answer provided by the search engine in response to a particular query. Exemplary search instant answers include, but are not limited to, a map provided by the search engine in response to an individual entering a street address into the search engine, or a weather forecast provided by the search engine in response to an individual entering "weather 90210" into the search engine. The term "site" is used herein to refer to a collection of related IOs. A web site is just one example of a site that includes a collection of related web pages and other IOs. As will be described in more detail hereafter, sites and IOs are generally accessible via a communications network such as the Internet or a private network. The term "re-visited site or IO" is used herein to refer to a site or IO that has been previously visited/viewed by one or more individuals. The term "sector" is used herein to refer to a segmented region of a computer display device (such as a monitor among other things) in which a particular type of graphical user interface (GUI) and/or information is displayed, or a particular type of function is performed.

1.0 Search Engine Queries

Generally speaking and as described heretofore, individuals routinely use a search engine, or a plurality of different search engines, to locate particular information they are interested in. As is appreciated in the arts of personal computing, the Internet and the World Wide Web, these information searches can be performed within various realms such as a specific computer, a specific site, a specific enterprise intranet, and the like. These information searches can also be web searches, social searches, twitter searches, and the like. These information searches can also be initiated from various types of end points such as a personal computer, a mobile device, and the like.

For PNQs, one or more individuals submit a query to a search engine where the query specifies a particular site or IO that the individuals are interested in (i.e., want to locate) and thus intend to navigate to (i.e., intend to visit/view). The individuals typically employ a browser application to submit the query, where the query includes one or more query keywords (i.e., query terms) that the individuals associate with the particular site or IO, and these keywords are typically either entered by the individuals into a search box of the browser application, or displayed on a web page via the browser application. As is appreciated in the arts of the Internet and World Wide Web, the search engine provides the individuals with search results that include a list of one or more information links (such as Uniform Resource Locators (URLs) and the like), where each information link is generally associated with a particular site or IO. More particularly, each information link specifies where a given site or IO identified in the search results is located, and provides a mechanism for retrieving the site or IO (such as its Internet location and the like). As such, the terms "information link" and "site or IO" are herein used somewhat interchangeably, although IOs can also refer to answers returned directly by the search engine. The search results are typically displayed to the individuals via the browser application, and the individuals click on a given information link in the results in order to visit/view additional content of the site or IO that is associated with the link.

As is appreciated in the arts of the Internet and World Wide Web, search engines are generally targeted towards helping individuals locate a specific new site or IO they are interested in but have not previously viewed/visited. However, individuals also regularly use search engines to re-visit a site or IO that they have previously viewed/visited. This later activity is herein generally referred to as "re-visiting." In these re-visiting situations the individuals submit the same or a similar query to a search engine that they have previously submitted to the search engine. It is appreciated that almost 40% of all queries submitted to search engines involve situations where individuals want to return to a site or IO that they have previously located via a separate search. Whether driven by the individuals' desire to remember information they have previously viewed/visited, or to discover new content associated with a previously viewed/visited site or IO, queries that result in the individuals' repeat viewing/visiting or clicking on an information link associated with a particular site or IO that they have previously viewed/visited or clicked account for a substantial portion of the search engines' traffic.

In some search situations where a plurality of individuals each submits queries to a search engine having the same keywords, the search engine might be able to accurately predict (i.e., conclude) that all of the individuals are interested in the same site or IO. By way of example but not limitation, a search engine might be able to accurately predict that all individuals who submit the query "msn" want to navigate to the www.msn.com site on the Internet. However, in other search situations where a plurality of individuals each submits queries to a search engine having the same keywords, different individuals might be interested in navigating to different sites or IOs. By way of example but not limitation, consider the query "sigir." A first individual might be interested in accessing a site on the Internet associated with the SIGIR conference (www.sigir2010.org). The same query might mean something different to a second individual, such as the site for the Special Inspector General for Iraq Reconstruction (www.sigir.mil). So if the search engine receives the same query from the second individual, the search engine cannot accurately predict that the second individual also wants to navigate to the SIGIR conference site since they may want to navigate to a different site.

2.0 Terminology

FIG. 2 illustrates an exemplary log of a sequence of queries submitted to a search engine by an individual. This exemplary query log will hereafter be used to define some terminology that is associated with the personalized navigation technique embodiments described herein. It is noted that other query logs (not shown) are also possible where the logs include a sequence of queries submitted to a search engine by a group of interrelated individuals.

Referring again to FIG. 2, the first column 200 of the log specifies the day in which a given set of queries takes place. The second column 202 of the log generally specifies types of activity by the individual. More particularly, a $Q_X$ in the second column 202 indicates that the individual submitted a query to the search engine. A $C_{xy}$ in the second column 202 indicates that the individual clicked on a particular information link included in the search results displayed to the individual. The third column 204 of the log specifies the keywords of each query $Q_X$ that are entered by the individual and submitted to the search engine. The fourth column 206 specifies the information link that the individual clicked on for each click $C_{xy}$ in the log.

A "re-visiting" situation is herein considered to be a situation where an individual clicks on a particular information link which is included in one set of search results displayed to the individual following one query, and then later clicks on the same link which is included in another set of search results displayed to the individual following a subsequent query. FIG. 2 exemplifies the following re-visiting situations. The Centers for Disease Control and Prevention (CDC) swine flu website (www.cdc.gov/H1N1Flu) visited on Monday (click $C_{13}$) via an individual's first query ($Q_1$) is re-visited again later that same day (click $C_{32}$) and also on subsequent days (clicks $C_{41}$, $C_{61}$ and $C_{71}$). As exemplified in FIG. 2, in some cases the query keywords used to re-visit a particular site or IO will be the same as the query keywords that were used to previously visit the site/object (such as queries Q6 and Q7 which are both cdc swine flu). In other cases the query keywords used to re-visit a particular site or IO will be different from the query keywords that were used to previously visit the site/object (such as query $Q_4$ which is h1n1, and query $Q_5$ which is swine flu). It is noted that situations can also exist (not shown) where an individual clicks more than one information link for a given query; these situations are herein also considered to be re-visiting situations.

Referring again to FIG. 2, the personalized navigation technique embodiments described herein generally focus on sequential pairs of PNQs that are submitted to a search engine. Queries $Q_1$ and $Q_3$ exemplify one PNQ pair. Queries $Q_3$ and $Q_4$ exemplify another PNQ pair. However, Queries $Q_1$ and $Q_4$ are not considered to be a PNQ pair. There can be one or more intervening queries between a PNQ pair that do not result in a click on the information link associated with a re-visited site or IO (hereafter also referred to as a "re-visited information link"), such as query $Q_2$. The first query in a given PNQ pair is herein considered to be a "previous query." The subsequent query in the PNQ pair is herein considered to be a PNQ.

Referring again to FIG. 2, a previous query may not be the first query that results in a click on the re-visited information link, as is exemplified by query $Q_3$ in the $Q_3/Q_4$ query pair. In fact, even though Q1 is the first query in the log that leads to the CDC swine flu website (www.cdc.gov/H1N1Flu), Q1 may also not be the first query that has ever lead to the re-visited information link (www.cdc.gov/H1N1Flu); it is just the first such query observed in the log. The term "single-click query" is used herein to refer to a query submitted to a search engine after which the individual who submitted the query clicks on just one information link in the search results displayed to them. The term "multi-click query" is used herein to refer to a query submitted to a search engine after which the individual who submitted the query clicks on a plurality of information links in the search results displayed to them. A situation where a plurality of queries is submitted to a search engine by a given individual or a group of interrelated individuals, and each of the queries results in the individual(s) re-visiting the same site or IO (i.e. the same information link) is herein considered to be a "personal navigational chain." Thus, queries $\{Q_1, Q_3, Q_4, Q_6, Q_7\}$ exemplify a personal navigational chain.

Generally speaking and referring again to FIG. 2, a query submitted to a search engine that is not used (by the individual who submitted it) for re-visiting is herein considered to be a "new-visiting query." In other words, a new-visiting query is a query submitted to a search engine via which an individual intends to navigate to a site or IO that they have not previously viewed/visited. As such, previous queries that are not also PNQs are herein considered to be new-visiting queries. Thus, query $Q_1$ exemplifies a new-visiting query.

A "session" is herein considered to be a prescribed subset of an individual's or a group of interrelated individuals' search activity. In one embodiment of the personalized navigation technique described herein the prescribed subset can be a prescribed time period (such as 30 minutes, among other time periods) during which the queries $Q_X$ and associated information link clicks $C_{xy}$ occur. In another embodiment of the personalized navigation technique the prescribed subset can be the queries $Q_X$ and associated information link clicks $C_{xy}$ that are related to a particular topic. In yet another embodiment of the personalized navigation technique the prescribed subset can be the queries $Q_X$ and associated information link clicks $C_{xy}$ that occur between visits to a particular homepage. Identical queries submitted to a search engine by a given individual or a given group of interrelated individuals during a session are herein considered to be different query instances. A "previous session" is herein considered to be a session in which a previous query resides. A "personal navigational session" is herein considered to be a session in which a PNQ resides.

After an individual clicks on an information link displayed to them in a given set of search results, they may continue to click on one or more additional information links before submitting another query to the search engine. The collection of these information links they click on is referred to herein as their "trail," and each link in a trail is referred to herein as a "hop." A trail begins at an individual's first click on an information link displayed to them in search results from a given query. The trail ends whenever the individual either does not click on another information link for the aforementioned prescribed time period, or clicks on a bookmark in their browser application, or closes their browser application, or enters an information link address into an address bar of their browser application, or submits another query to the search engine. In situations where a trail is longer than the prescribed time period, subsequent queries are considered part of a new session.

Whenever an individual follows a trail from an information link that was located via a previous query, this trail is referred to herein as a "previous trail." Whenever an individual follows a trail from an information link that was re-visited via a PNQ, this trail is referred to herein as a "personal navigational trail." It is noted that a personal navigational trail may or may not involve additional re-visiting.

3.0 Personalized Navigation Using a Search Engine

Generally speaking, the personalized navigation technique embodiments described herein provide personalized navigation for one or more individuals' use of a search engine. As described heretofore, personalized navigation is a specific kind of re-visiting behavior by one or more individuals. The personalized navigation technique embodiments are advantageous for a variety of reasons including, but not limited to, the following. An individual's search experience is optimized by minimizing the amount of time it takes for them to navigate to a particular site or IO they previously viewed/visited (i.e., the time it takes for an individual to re-visit a particular site or IO is minimized).

As is appreciated in the arts of the Internet and World Wide Web, a search engine query log dataset can provide historic insight into the behavior of the search engine upon receiving queries submitted from a potentially very large collection of individuals. Exemplary historic data maintained in a search engine query log dataset includes, but is not limited to, the queries that were received and the particular individual that submitted each query, the information links that each individual clicked on in the search results that were displayed to them, the rank position of the clicked results, and time stamp information. A browser application log dataset or other client-side instrumentation application can provide historic insight into the navigational behavior of one or more individuals, such as the trails they followed, after the search engine provides search results to the browser application and the browser application displays the results to the individuals. Exemplary historic data maintained in a browser application log dataset includes, but is not limited to, the information links that the individuals clicked on in the search results that were displayed to them. It is noted that since individuals can and typically do use a plurality of different search engines when searching for a particular site or IO, a browser application log dataset includes information on clicked information links for each different search engine used. A large-scale, periodic crawl dataset can provide historic insight into the content of the particular sites or IOs associated with information links that individuals click on, along with how the content thereof may have changed between the individuals' different link clicks thereon.

As will be described in more detail hereafter, search engines can provide personalized navigation support for one or more individuals' use thereof by predicting the individuals' future navigational behavior (i.e., by predicting the search result that the individuals are most likely to click on). Based on a time-correlated analysis of exemplary search engine query log datasets, an exemplary browser application log dataset and an exemplary periodic crawl dataset (hereafter collectively simply referred to as the "analysis"), it is observed that PNQs can be identified via an individual's or a group of interrelated individuals' past re-visiting behavior. Exemplary re-visiting situations along with the related re-visiting behavior of search engines and individuals have been described heretofore. It is further observed that a given search engine can predict an individual's or a group of interrelated individuals' future navigational behavior with a high degree of accuracy based on the individual's (or their group's) past re-visiting behavior. Future search results displayed to the individual or another individual in their group by the search engine can be personalized based on this prediction.

FIG. 1 illustrates an exemplary embodiment, in simplified form, of a process for providing personalized navigation for one or more individuals' use of a search engine. As exemplified in FIG. 1, the process starts in block 100 by indentifying if a query submitted to the search engine is a PNQ. Whenever the query is identified to be a PNQ (block 102), the particular site or IO associated with the query is identified (block 104), and the results of the search are personalized based on knowledge of the identified site or IO (block 106). The one or more individuals for whom personalized navigation is provided can be identified using various methods such as cookies, user login information or other user account information, IP address information or related IP addresses, query history information, browsing history information, organizational information such as workgroups and the like, geo-location information, demographic similarity, similar query history information, similar interaction history information, and location similarity, among others.

A more detailed description of exemplary embodiments of ways in which PNQs can be identified, exemplary embodiments of ways in which the particular site or IO associated with PNQs can be identified, and exemplary embodiments of ways in which results of the search can be personalized will now be provided. It is noted that although this more detailed description is provided in the context of an individual using a search engine, an alternate embodiment of the personalized navigation technique described herein is possible where personalized navigation is provided for a group of two or more interrelated individuals using of a search engine. Examples of such a group of interrelated individuals include, but are not limited to, a plurality of individuals who share the same user account on a given computer, a plurality of individuals who are members of the same workgroup, a plurality of individuals who share similar past common queries, a plurality of individuals who share the same geo-location, and a plurality of individuals who share the same browsing history. In this alternate embodiment a PNQ is a query via which an individual in the group intends to navigate to a particular site or IO that they or someone else in the group previously viewed/visited. The search engine amalgamates the navigational behavior of all the interrelated individuals in the group and uses this amalgamated behavior to predict the future navigational behavior of the individuals in the group based on an amalgamation of their past re-visiting behavior.

3.1 Identification of Personal Navigational Queries (PNQs)

This section describes exemplary characteristics of PNQs and related re-visiting behavior that are observed in the aforementioned analysis. These characteristics can be used to identify PNQs.

In the analysis it is observed that PNQs can be identified reliably in a variety of situations. By way of example, but not limitation, consider a situation where a current query submitted by an individual to a search engine has previously been submitted by the individual to the search engine two or more times, and where the most recent two of these previously submitted queries preceding the current query which were followed by a click were both followed by the individual clicking on just a single, common information link that is included in the search results (i.e., the individual clicks on the same, single information link following both of these previously submitted queries). In this situation it is observed that the current query can be reliably predicted to be a PNQ, and the single, common information link can be reliably predicted to be the navigation target of this query.

Additional information such as a query's length, a query's commonness, a query's location in a search session, the individual's click (i.e., navigational) behavior following a query, and the like, are also useful in indentifying PNQs, even in cases where there is less search history or where the PNQ has changed from what has been previously submitted to the search engine. In other words, PNQs can be identified using various types of measures. In one embodiment of the personalized navigation technique described herein, syntactic or semantic measures of query similarity to one or more previous queries in the individual's search history (hereafter simply referred to as syntactic or semantic measures of query similarity) can be used to identify if a query submitted to a search engine is a PNQ. In another embodiment of the personalized navigation technique, behavioral measures of query similarity to one or more previous queries in the individual's search history (hereafter simply referred to as behavioral measures of query similarity) can be used to identify if a query submitted to a search engine is a PNQ. In yet another embodiment of the personalized navigation technique, system-dependent measures of query similarity can be used to identify if a query submitted to a search engine is a PNQ. Exemplary embodiments of each of these measures of query similarity, along with additional ways in which PNQs can be identified, will now be described in more detail.

It is appreciated that character edit distance (also known as character count) is one way to measure the syntactic similarity of query terms. In the analysis it is observed that PNQs have one or more terms whose syntactic similarity (such as character edit distance and the like) is close to the terms in one or more queries that were previously submitted to the search engine by the individual via which the individual intended to navigate to a site or IO that they may or may not have previously viewed. This exemplifies one embodiment of syntactic or semantic measures of query similarity. It is further observed that the character count of PNQs is substantially shorter than the character count of new-visiting queries. By way of example but not limitation, it is observed that PNQs have an average count of 12.1 characters, while new-visiting queries have an average count of 18.9 characters. This exemplifies another embodiment of syntactic or semantic measures of query similarity. It is yet further observed that the character count of PNQs that occur within the same session is generally longer than the character count of PNQs that occur across a plurality of sessions. This exemplifies yet another embodiment of syntactic or semantic measures of query similarity. It is yet further observed that the terms of PNQs generally substantially overlap with the keywords of corresponding previous queries. In other words, the terms of PNQs are generally either a proper subset of the keywords of corresponding previous queries or vice versa. This exemplifies yet another embodiment of syntactic or semantic measures of query similarity.

It is also appreciated that WordNet class membership is one way to measure the semantic similarity of query terms. In the analysis it is observed that PNQs have one or more terms whose semantic similarity (such as WordNet class membership and the like) is close to the terms in one or more queries that were previously submitted to the search engine by the individual via which the individual intended to navigate to a site or IO that they may or may not have previously viewed. This exemplifies yet another embodiment of syntactic or semantic measures of query similarity.

Generally speaking, the commonness of a PNQ is a function of whether it is being used to re-visit a particular site or IO that was previously visited in the same session as the PNQ or a session prior to that of the PNQ. More particularly, in the analysis it is observed that whenever a PNQ is used to re-visit a particular site or IO that was previously visited in the same session as the PNQ, the PNQ is less common than corresponding previous queries. This exemplifies one embodiment of behavioral measures of query similarity. Whenever a PNQ is used to re-visit a particular site or IO that was previously visited in a session prior to that of the PNQ, the PNQ is more common than corresponding previous queries. This exemplifies another embodiment of behavioral measures of query similarity.

Additional embodiments of semantic measures of query similarity include, but are not limited to the following. Analysis of the search results for two queries can be performed using different criteria such as search term overlap, category membership in the Open Directory or other ontologies, category membership assigned via learned text classification algorithms, and the like. Unsupervised clustering of large text collections can also be performed using latent topic models or other such clustering techniques. Additionally, behavioral interaction patterns can be used to identify queries that lead to clicks on the same sites or IOs, or clicks on the anchor text associated with a site or IO.

As is appreciated in the arts of the World Wide Web and search engines, a search engine generally ranks each search result (i.e., each site or IO that was located in a search) based on the search engine's prediction of how closely the search result matches the query keywords that were submitted to the search engine. The search engine places search results having the highest ranking at the top of the aforementioned list of information links that are displayed to the individual. Search results that are re-visited via PNQs rank significantly higher than the same search results that were visited via corresponding previous queries. In other words, compared to a previous query that results in the individual clicking on a given information link, a corresponding PNQ ranks the re-visited information link significantly higher. This exemplifies one embodiment of system-dependent measures of query similarity.

While the keywords of new-visiting queries can refer to transient text content within a site or IO (i.e., text content which changes over time), the keywords of PNQs tend to refer to static text content within a re-visited site or IO (i.e., text content which does not change over time). This exemplifies another embodiment of system-dependent measures of query similarity.

The keywords of PNQs within a given personal navigational chain generally converge quickly (i.e., quickly become the same) as the queries progress in the chain. In other words, it is observed that when an individual repeatedly submits queries to a search engine to locate the same site or IO, the query keywords may initially differ somewhat but will quickly become the same over time. Stated differently, individuals tend to converge quickly on a particular query to use for re-visiting a particular site or IO, and tend to re-use the particular query whenever they want to re-visit the site or IO again at a later time. This exemplifies yet another embodiment of behavioral measures of query similarity.

A current query submitted to the search engine in a current session can be reliably predicted to be a PNQ using the following additional behavioral measures of query similarity. In the analysis it is observed that the most popular query in a previous session that includes the current query can be reliably predicted to be a PNQ. Generally speaking, it is further observed that another specific query in a previous session that includes the current query can be reliably predicted to be a PNQ. Examples of this specific query include, but are not limited to, the first query in a previous session that includes the current query, and the last query in a previous session that includes the current query. It is yet further observed that a query in a previous session that includes the current query that has been reformulated by the individual in a manner that makes it similar to the current query can be reliably predicted to be a PNQ. It is yet further observed that a query which is preceded or followed by a similar trail can also be reliably predicted to be a PNQ.

An individual can intentionally choose to create a PNQ by explicitly telling the search engine via an interaction therewith to map a particular query to a particular site or IO. This exemplifies yet another embodiment of system-dependent measures of query similarity.

The way in which an individual uses a re-visited site or IO can generally be determined by analyzing the trail the individual followed after they clicked on the information link associated with the site or IO displayed to them in a given set of PNQ search results. It is observed that in situations where an individual submits a PNQ to a search engine to re-visit a particular site or IO that they previously viewed/visited, the way in which the individual subsequently uses the search results is generally the same. More particularly, if an individual submits a PNQ to a search engine to re-visit previously viewed/visited information that was reached via a re-visited site or IO, the personal navigational trail overlaps and is thus generally similar to the corresponding previous trail, which indicates that the individual performed the same activities after re-visiting the site or IO they were interested in. This exemplifies yet another embodiment of behavioral measures of query similarity. If an individual submits a PNQ to a search engine to locate new information on a re-visited site or IO, the personal navigational trail can be different than the corresponding previous trail. This exemplifies yet another embodiment of behavioral measures of query similarity.

Generally speaking, it is observed that re-visiting behavior of individuals within the same session is very different than re-visiting behavior of individuals across a plurality of sessions. More particularly, it is observed that when a PNQ pair occurs within the same session, this is indicative of the individual returning to a previously visited site or IO that they previously believed did not satisfy their information need, but they return thereto to reevaluate if the site or IO now satisfies their information need. This exemplifies yet another embodiment of behavioral measures of query similarity. Conversely, it is observed that when a PNQ pair occurs across a plurality of sessions, this is indicative of the individual returning to a previously visited site or IO in order to resume a task they previously started but did not complete. This exemplifies yet another embodiment of behavioral measures of query similarity.

PNQs can also be identified using other methods. By way of example, but not limitation, in another embodiment of the personalized navigation technique described herein data mining techniques (such as large-scale log analysis and the like) in combination with machine learning techniques can be used to identify other measures of query similarity.

3.2 Identification of Sites or Information Objects (IOs) Associated with Personal Navigational Queries (PNQs)

This section describes exemplary characteristics of sites or IOs associated with PNQs that are observed in the aforementioned analysis. These characteristics can be used to identify the particular sites or IOs that are associated with PNQs.

Generally speaking, the particular site or IO associated with a PNQ can be identified using various types of measures. In one embodiment of the personalized navigation technique described herein, syntactic or semantic measures of site or IO similarity with sites or IOs used during associated queries from the individual's search history (hereafter simply referred to as syntactic or semantic measures of site or IO similarity) are used to identify the particular site or IO that is associated with a PNQ. In another embodiment of the personalized navigation technique, behavioral measures of site or IO similarity with sites or IOs used during associated queries from the individual's search history (hereafter simply referred to as behavioral measures of site or IO similarity) are used to identify the particular site or IO that is associated with a PNQ. In yet another embodiment of the personalized navigation technique, system-dependent measures of site or IO similarity with sites or IOs used during associated queries from the individual's search history (hereafter simply referred to as system-dependent measures of site or IO similarity) are used to identify if a query submitted to a search engine is a PNQ. Exemplary embodiments of each of these measures of site or IO similarity will now be described.

In the analysis it is observed that the particular site or IO associated with a PNQ can be identified reliably by identifying sites or IOs in the search results that have substantial overlap in their associated information links with one or more previous sites or IOs that are related to associated previous queries. This exemplifies an embodiment of syntactic or semantic measures of site or IO similarity. Situations that exemplify this condition include, but are not limited to, the following. The text of the information link associated with a previous site or IO (hereafter referred to as the "previous link") may be exactly the same as the current site or IO, or it may be similar to the text of the information link associated with a current site or IO (hereafter referred to as the "current link"), such as the previous link ending in ".htm" and the current link ending in ".html", or the previous link including the preceding "www." and the current link not including the preceding "www.", or the previous and current links being variants of the same spelling, and the like. The previous and current links may also mean the same thing, such as the previous and current links leading to the same site or IO, or the previous and current links containing words that are synonyms, and the like.

It is further observed that the particular site or IO associated with a PNQ can be identified reliably by identifying sites or IOs that the individual interacted with immediately following an associated previous query or queries. This exemplifies one embodiment of behavioral measures of site or IO similarity. A situation that exemplifies this condition is where the individual submitted an associated previous query and immediately thereafter clicked on a particular information link; the site or IO associated with this link can be predicted to be the site or IO associated with the PNQ. It is yet further observed that the particular site or IO associated with a PNQ can be identified reliably by identifying sites or IOs that the individual interacted with in previous sessions that included an associated previous query or queries. This exemplifies another embodiment of behavioral measures of site or IO similarity. A situation that exemplifies this condition is where the individual submitted an associated previous query having the term "jaime"; the individual subsequently clicked on nothing in the search results, but rather submitted a different query having the term "jaime teevan"; the individual subsequently clicked on the information link "http://teevan.org" provided in the search results; the next time the individual submits a query having the term "jaime", the site or IO associated with "http://teevan.org" can be predicted to be the site or IO associated with this query.

It is yet further observed that the particular site or IO associated with a PNQ can be identified reliably by identifying sites or IOs that are informed by the individual's post-click browsing patterns in a personal navigational trail. This exemplifies yet another embodiment of behavioral measures of site or IO similarity. A situation that exemplifies this condition is where the individual submitted an associated previous query; the individual then clicked on an information link provided in the search results that is associated with the New York Times homepage; after viewing this homepage the individual then clicked on one or more of additional information links ending with a click on the "Today's Paper" information link; if the individual re-submits the previous query at a future time the site or IO associated with the "Today's Paper" information link can be predicted to be the site or IO associated with this query.

It is yet further observed that the particular site or IO associated with a PNQ can be identified reliably by identifying sites or IOs that are consistently returned in the same position in the search results for an associated previous query. This exemplifies one embodiment of system-dependent measures of site or IO similarity. It is yet further observed that the particular site or IO associated with a PNQ can be identified reliably by identifying sites or IOs that receive similar treatment by the search engine during crawling, indexing, or pre-processing operations. This exemplifies another embodiment of system-dependent measures of site or IO similarity. Situations that exemplify this condition include, but are not limited to, sites or IOs that are crawled at the same rate, sites or IOs that have the same meta-data associated with them, and the like. It is yet further observed that the particular site or IO associated with a PNQ can be identified reliably by identifying sites or IOs that receive similar treatment by the search engine at search time. This exemplifies yet another embodiment of system-dependent measures of site or IO similarity. Situations that exemplify this condition include, but are not limited to, sites or IOs that have the same or similar snippets displayed, sites or IOs that have deep links displayed, sites or IOs that are starred, and the like.

The particular site or IO associated with a PNQ can also be identified using other methods. By way of example, but not limitation, in another embodiment of the personalized navigation technique described herein data mining techniques (such as large-scale log analysis and the like) in combination with machine learning techniques can be used to identify other measures of site or IO similarity.

3.3 Personalization of Search Results

Given that a PNQ has been submitted to a search engine, and given that the particular site or IO associated with the PNQ has been identified, this section describes exemplary embodiments of ways in which results of the search can be personalized.

Generally speaking, results of the search can be personalized by maintaining a record of the individual's search or interaction history in the search engine and displaying various aspects of this record to the individual. Examples of these various aspects of the individual's search or interaction history record are described in more detail hereafter. These various aspects can be displayed to the individual in a variety of ways. By way of example but not limitation, these various aspects can either be displayed to the individual automatically at the beginning of a new session, or on demand via a history viewer application, or in context as the individual conducts a related follow-on search, or prior to the search on the search page, or prior to the search as part of a GUI for the query, or in various combinations of these ways. It is noted that at the end of a session the search engine can optionally suggest to the individual that they store any valuable information that was visited during the search for future use.

As is appreciated in the art of GUIs, particular information displayed to an individual via a GUI can be emphasized in various ways such as highlighting or underlining the information, displaying the information in a different color from the rest of the information being displayed, placing the information at the top of a sector in which all the information being displayed, placing the information first in a list of all the information, displaying additional information about an item that would typically be displayed (including information about how the item has changed or information about the individual's interaction history with the item), and the like. Another way to personalize results of the search is to emphasize PNQs that reside in the history record. The corresponding previous queries can optionally be removed from the history record information that is displayed to reduce clutter.

Yet another way to personalize results of the search is to emphasize sites or IOs that are strongly associated with PNQs in the search results.

Yet another way to personalize results of the search is to emphasize the sites or IOs residing in the history record that were most frequently re-visited. Yet another way to personalize results of the search is to associate these most frequently re-visited sites or IOs with just the most recent query keywords. Yet another way to personalize results of the search is for the aforementioned browser application to convert these most frequently re-visited sites or IOs into either bookmarks, or shortcuts, or other easily and generally available links.

Yet another way to personalize results of the search is to emphasize sites or IOs that are visited via a single-click query. Yet another way to personalize results of the search is to emphasize sites or IOs that are visited first following a multi-click query. Yet another way to personalize results of the search is to emphasize sites or IOs that are visited at the end of a multi-click query. Yet another way to personalize results of the search is to emphasize sites or IOs that are visited most frequently following a multi-click query. Yet another way to personalize results of the search is to emphasize sites or IOs that are visited at the end of a session. Yet another way to personalize results of the search is to suggest a particular site or IO that was previously visited in response to a previous query in a personal navigational chain submitted to the search engine.

Yet another way to personalize results of the search is to increase the size of the sector in which the results are displayed, and use the increased sector size to display additional information about the particular site or IO associated with the PNQ besides the information link associated therewith. Examples of such additional information include, but are not limited to, how the site or IO has changed since it was last viewed/visited by the individual, a thumbnail of the site or of the first page of the IO, information links to additional information associated with particular content in the site or IO that the individual might want to explore, information links the individual clicked on following (i.e., the trail the individual followed after) their last visit to (i.e., viewing of) the site or IO, a more detailed summary snippet for the site or IO, and information about previous interaction history (where this information includes either time, or frequency, or time and frequency). Yet another way to personalize results of the search is to take the individual directly to the site or IO (i.e., display the site or IO directly) rather than displaying the information link associated therewith.

As described heretofore, search results that are re-visited via PNQs rank significantly higher than the same search results that are visited via corresponding previous queries. Thus, it is observed that PNQs are generally higher quality than previous queries. Based on this observation, yet another way to personalize results of the search is as follows. Whenever a previous query in a personal navigational chain is submitted to the search engine, the search engine can suggest the corresponding PNQ to the individual. It is noted that commonly submitted PNQs can also make good generic keywords or tags for their associated sites or IOs.

4.0 Additional Embodiments

While the personalized navigation technique has been described in more detail by specific reference to embodiments thereof, it is understood that variations and modifications thereof can be made without departing from the true spirit and scope of the personalized navigation technique. By way of example but not limitation, in the personalized navigation technique embodiments described heretofore each query is explicitly submitted to the search engine by an individual. In other words, each query submitted to the search engine is an explicit query where an individual explicitly enters the query keywords into their browser application's search box (the keywords explicitly identifying a particular site or IO), or an individual explicitly enters the query keywords into their browser application in another like manner. However, an alternate embodiment of the personalized navigation technique is possible where one or more queries are submitted to the search engine in an automated manner. In other words, one or more of the queries submitted to the search engine can be implicit (i.e., inferred) queries where the query keywords are not explicitly entered by an individual, but rather the query is automatically generated either by their browser application, or by another like manner, based on at least one of their current or prior query behavior, or their current or prior navigational behavior. Example implicit query scenarios include, but are not limited to the following. Consider a first case where, whenever an individual clicks on a first information link associated with a first particular site or IO, the individual always next clicks on a second information link associated with a second particular site or IO. In this first case, whenever the individual submits an explicit query to the search engine for the first site or IO, their browser application can then automatically generate and submit an implicit co-query to the search engine for the second site or IO. Additionally, consider a second case where, whenever an individual submits a query to the search engine having the keyword "dog," the individual always next submits a query to the search engine having the keyword "cat." In this second case, whenever the individual submits an explicit query to the search engine having the keyword "dog," their browser application can then automatically generate and submit an implicit co-query to the search engine having the keyword "cat."

Another alternate embodiment of the personalized navigation technique is possible where a query includes any indication of an individual's interest in navigating to a particular site or IO. By way of example, but not limitation, if an individual always performs a search for something after visiting/viewing a particular site, or reading a particular email, or searching for a particular thing, the individual's action of visiting/viewing that particular site, or reading that particular email, or searching for that particular thing can be considered to be a query for the something.

Additionally, rather than employing a browser application to submit the query, an individual can also employ a desktop application other than a browser application to submit the query. In the case where an individual is using a mobile device, the individual can also employ a mobile application other than a browser application to submit the query.

It is also noted that any or all of the aforementioned embodiments can be used in any combination desired to form additional hybrid embodiments. Although the personalized navigation technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

5.0 Computing Environment

This section provides a brief, general description of a suitable computing system environment in which portions of the personalized navigation technique embodiments described herein can be implemented. These personalized navigation technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multi-processor systems, microprocessor-based systems, set top boxes, programmable consumer electronics, network PCs, minicomputers, mainframe computers, distributed computing environments that include any of the aforementioned systems or devices, and the like.

Figure 3:
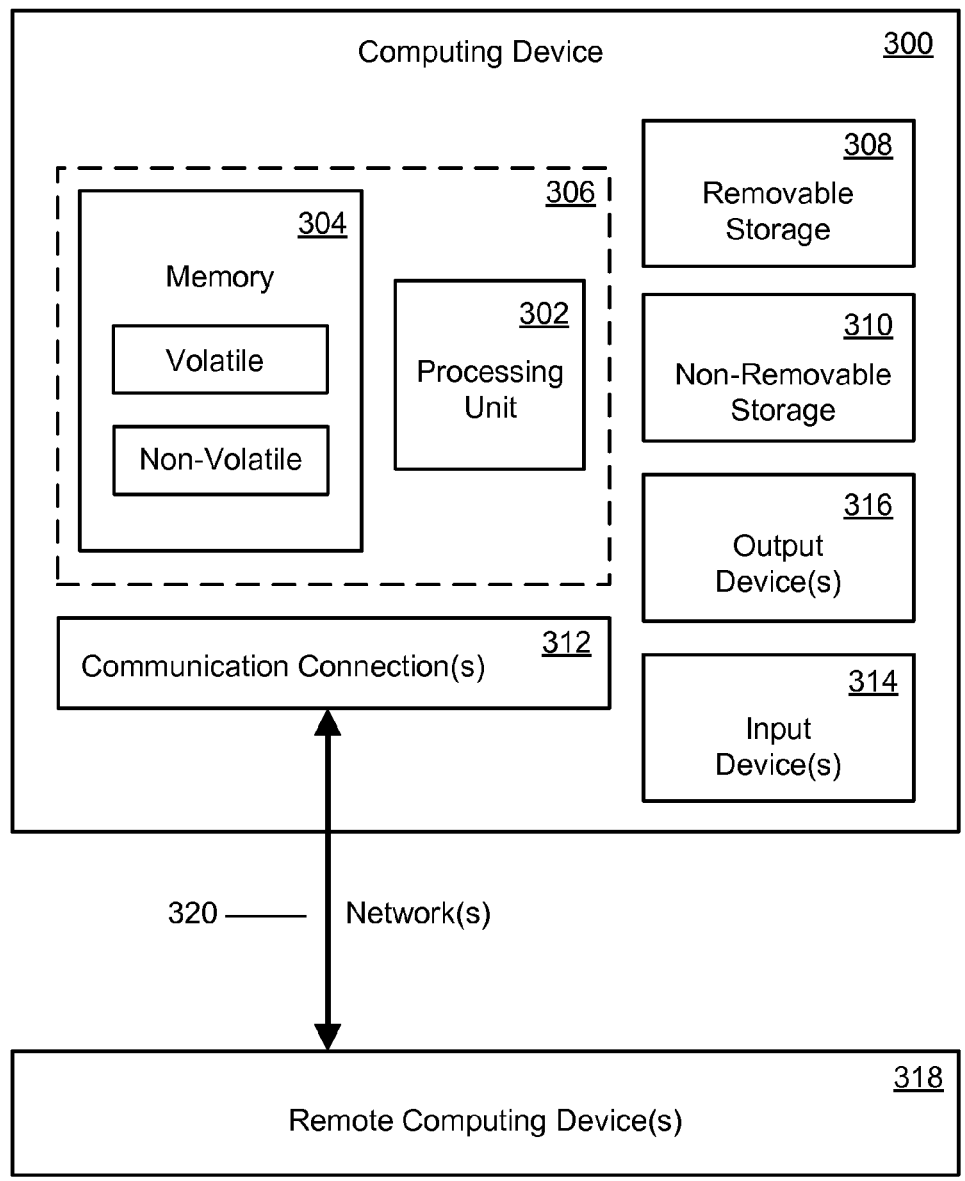
FIG. 3 is a diagram illustrating an exemplary embodiment, in simplified form, of a general purpose, network-based computing device which constitutes an exemplary system for implementing portions of the personalized navigation technique embodiments described herein.

FIG. 3 illustrates an exemplary embodiment, in simplified form, of a suitable computing system environment according to the personalized navigation technique embodiments described herein. The environment illustrated in FIG. 3 is only one example of a suitable computing system environment and is not intended to suggest any limitation as to the scope of use or functionality of the personalized navigation technique embodiments described herein. Neither should the computing system environment be interpreted as having any dependency or requirement relating to any one or combination of components exemplified in FIG. 3.

As exemplified in FIG. 3, an exemplary system for implementing portions of the personalized navigation technique embodiments described herein includes one or more computing devices, such as computing device 300. In its simplest configuration, computing device 300 typically includes at least one processing unit 302 and memory 304. Depending on the specific configuration and type of computing device, the memory 304 can be volatile (such as RAM), non-volatile (such as ROM and flash memory, among others) or some combination of the two. This simplest configuration is illustrated by dashed line 306.

As exemplified in FIG. 3, computing device 300 can also have additional features and functionality. By way of example, computing device 300 can include additional storage such as removable storage 308 and/or non-removable storage 310. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 300 such as computer readable instructions associated with an operating system, application programs and other program modules, and data structures, among other things. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 300. Any such computer storage media can be part of computing device 300.

As exemplified in FIG. 3, computing device 300 also includes a communications connection(s) 312 that allows the device to operate in a networked environment and communicate with a remote computing device(s), such as remote computing device(s) 318. Remote computing device(s) 318 can be a PC, a server, a router, a peer device, or other common network node, and typically includes many or all of the elements described herein relative to computing device 300. Communication between computing devices takes place over a network(s) 320, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 312 and related network(s) 320 described herein are exemplary and other means of establishing communication between the computing devices can be used.

As exemplified in FIG. 3, communications connection(s) 312 and related network(s) 320 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 3, computing device 300 also includes an input device(s) 314 and output device(s) 316. Exemplary input devices 314 include, but are not limited to, a keyboard, mouse, pen, touch input device, microphone, and camera, among others. An individual can enter commands and various types of information into the computing device 300 through the input device(s) 314. Exemplary output devices 316 include, but are not limited to, a display device (s), printer, and audio output devices, among others. These input and output devices are well known and need not be described at length here.

Referring again to FIG. 3, the personalized navigation technique embodiments described herein can be further described and/or implemented in the general context of computer-executable instructions, such as program modules, which are executed by computing device 300. Generally, program modules include routines, programs, objects, components, and data structures, among other things, that perform particular tasks or implement particular abstract data types. The personalized navigation technique embodiments can also be practiced in a distributed computing environment where tasks are performed by one or more remote computing devices 318 that are linked through a communications network 312/320. In a distributed computing environment, program modules can be located in both local and remote computer storage media including, but not limited to, memory 304 and storage devices 308/310.

Wherefore, what is claimed is:

1. A computer-implemented process for providing personalized navigation for one or more individuals' use of a search engine, comprising:

using a computer to perform the following process actions:
identifying if a query submitted to the search engine is a personal navigational query (PNQ) using syntactic or semantic measures of query similarity to one or more previous queries in the individual's or individuals' search history to identify said query, wherein a PNQ comprises a query designed to navigate to a particular site that was previously viewed by the individual or individuals or an information object (IO) that was previously viewed by the individual or individuals; and whenever said query is identified to be a PNQ,
identifying the particular site or IO associated with said query, said identifying comprises at least one of, using syntactic or semantic measures of site or IO similarity with sites or IOs used during associated queries from said history to identify said particular site or IO, or using system-dependent measures of site or IO similarity with sites or IOs used during associated queries from said history to identify said particular site or IO, personalizing results of the search based on knowledge of the identified site or IO.

2. The process of claim 1, wherein, the process action of using syntactic or semantic measures of query similarity to one or more previous queries in the individuals' search history to identify said query comprises at least one of the following actions:

identifying a query having one or more terms whose syntactic similarity is close to terms in one or more queries previously submitted to the search engine by the individuals via which the individuals intended to navigate to a site or IO that they may or may not have previously viewed; or identifying a query having one or more terms whose semantic similarity is close to the terms in one or more queries previously submitted to the search engine by the individuals via which the individuals intended to navigate to a site or IO that they may or may not have previously viewed;

the process action of using syntactic or semantic measures of site or IO similarity with sites or IOs used during associated queries from said history to identify said particular site or IO comprises an action of identifying sites or IOs having substantial overlap in their associated information links with one or more previous sites or IOs related to associated previous queries;

the process action of identifying the particular site or IO associated with said query, further comprises a process action of using behavioral measures of site or IO similarity with sites or IOs used during associated queries from said history to identify said particular site or IO, said using behavioral measures comprises at least one of the following actions:

identifying sites or IOs that the individuals interacted with in previous sessions that included an associated previous query or queries; or identifying sites or IOs that are informed by the individuals' post-click browsing patterns in a personal navigational trail; and the process action of using system-dependent measures of site or IO similarity with sites or IOs used during associated queries from said history to identify said particular site or IO comprises at least one of the following actions:

identifying sites or IOs that are consistently returned in the same position in the search results for an associated previous query; or identifying sites or IOs that receive similar treatment by the search engine during crawling, indexing, or pre-processing operations; or identifying sites or IOs that receive similar treatment by the search engine at search time.

3. The process of claim 1, wherein the process action of identifying if a query submitted to the search engine is a PNQ comprises an action of identifying that a current query has previously been submitted by the individuals to the search engine two or more times, wherein the most recent two of said previously submitted queries preceding the current query which were followed by a click were both followed by the individuals clicking on just a single, common information link included in the results of the search.

4. The process of claim 1, wherein the process action of personalizing results of the search based on knowledge of the identified site or IO comprises the actions of:

maintaining a record of the individuals' search or interaction history in the search engine; and displaying aspects of the individuals' search or interaction history record to the individuals.

5. The process of claim 4, wherein the process action of displaying aspects of the individuals' search or interaction history record to the individuals comprises at least one of the following actions:

emphasizing PNQs residing in said record; or emphasizing sites or IOs that are strongly associated with PNQs; or emphasizing sites or IOs that are visited at the end of a session; or displaying said aspects to the individuals automatically at the beginning of a new session; or displaying said aspects to the individuals in context as the individuals conduct a related follow-on search; or displaying said aspects to the individuals prior to the search on a search page; or displaying said aspects to the individuals prior to the search as part of a graphical user interface for the query.

6. The process of claim 4, wherein, the individuals employ either a browser application, or a desktop application other than a browser application, or a mobile application other than a browser application to submit queries to the search engine, and the process action of displaying aspects of the individuals' search or interaction history record to the individuals comprises at least one of the following actions:

emphasizing the sites or IOs residing in said record that were most frequently re-visited; or associating said most frequently re-visited sites or IOs with just the most recent query keywords.

7. The process of claim 4, wherein the process action of displaying aspects of the individuals' search or interaction history record to the individuals comprises at least one of the following actions:

emphasizing sites or IOs that are visited via a single-click query; or emphasizing sites or IOs that are visited first following a multi-click query; or emphasizing sites or IOs that are visited at the end of a multi-click query; or emphasizing sites or IOs that are visited most frequently following a multi-click query.

8. The process of claim 4, wherein the process action of displaying aspects of the individuals' search or interaction history record to the individuals comprises an action of emphasizing sites or IOs associated with PNQs in the search results, said emphasis comprising at least one of the following actions:

highlighting said sites or IOs; or underlining said sites or IOs; or displaying said sites or IOs in a different color from the rest of the information being displayed; or placing said sites or IOs at the top of a sector in which said aspects are being displayed.

9. The process of claim 4, wherein the process action of displaying aspects of the individuals' search or interaction history record to the individuals comprises the actions of:

increasing the size of a sector in which the results of the search are displayed; and using the increased sector size to display additional information about the particular site or IO besides an information link associated therewith, said additional information comprising at least one of,
  how said site or IO has changed since it was last viewed by the individuals, or
  information links the individuals clicked on following their last visit to said site or IO, or
  a more detailed summary snippet for the site or IO, or
  information about previous interaction history, said information comprising either time, or frequency, or time and frequency.

10. The process of claim 4, wherein the process action of displaying aspects of the individuals' search or interaction history record to the individuals comprises an action of taking the individuals directly to the particular site or IO rather than displaying an information link associated therewith.

11. The process of claim 4, wherein the process action of displaying aspects of the individuals' search or interaction history record to the individuals comprises the actions of:
  remembering commonly submitted PNQ pairs in the search engine; and
  whenever a previous query in a personal navigational chain is submitted to the search engine, suggesting the PNQ to the individuals.

12. The process of claim 1, wherein the one or more individuals are identified using at least one of:
  cookies; or
  user login information; or
  IP address information; or
  organizational information; or
  demographic similarity, or
  similar query history information, or
  similar interaction history information, or
  location similarity.

13. The process of claim 1, wherein the query submitted to the search engine comprises either,
  an explicit query having keywords that are explicitly entered by the individuals, wherein said keywords explicitly identify a particular site or IO, or
  an interaction where the individuals explicitly tell the search engine to map said query to the particular site or IO, or
  an implicit query which is automatically generated based on at least one of,
    the current query behavior of the individuals, or
    the prior query behavior of the individuals, or
    the current navigational behavior of the individuals, or
    the prior navigational behavior of the individuals.

14. A computer-implemented process for providing personalized navigation for one or more individuals' use of a search engine, comprising:
  using a computer to perform the following process actions:
  identifying if a query submitted to the search engine is a personal navigational query (PNQ) using behavioral measures of query similarity to one or more previous queries in the individuals' search history to identify said query, wherein a PNQ comprises a query designed to navigate to a particular site that was previously viewed by the individual or individuals or an information object (IO) that was previously viewed by the individual or individuals; and
  whenever said query is identified to be a PNQ,
    identifying the particular site or IO associated with said query, said identifying comprises at least one of,
      using syntactic or semantic measures of site or IO similarity with sites or IOs used during associated queries from said history to identify said particular site or IO, or
      using system-dependent measures of site or IO similarity with sites or IOs used during associated queries from said history to identify said particular site or IO, and
    personalizing results of the search based on knowledge of the identified site or IO.

15. The process of claim 14, wherein,
the process action of using behavioral measures of query similarity to one or more previous queries in the individuals' search history to identify said query comprises at least one of the following actions:
  identifying a particular query in a previous session comprising said query, said particular query comprising one of the most popular query in said session, or another specific query in said session, or a query having been reformulated by the individuals in a manner that makes it similar to said query; or
  identifying a query that is preceded or followed by a similar trail; or
  identifying a personal navigational chain, and identifying queries within said chain having keywords which become the same as said queries progress in said chain; or
  identifying a personal navigational trail that overlaps a corresponding trail from an information link that was visited via a previous query;
the process action of using syntactic or semantic measures of site or IO similarity with sites or IOs used during associated queries from said history to identify said particular site or IO comprises an action of identifying sites or IOs having substantial overlap in their associated information links with one or more previous sites or IOs related to associated previous queries;
the process action of identifying the particular site or IO associated with said query, further comprises a process action of using behavioral measures of site or IO similarity with sites or IOs used during associated queries from said history to identify said particular site or IO, said using behavioral measures comprises at least one of the following actions:
  identifying sites or IOs that the individuals interacted with in previous sessions that included an associated previous query or queries; or
  identifying sites or IOs that are informed by the individuals' post-click browsing patterns in a personal navigational trail; and
the process action of using system-dependent measures of site or IO similarity with sites or IOs used during associated queries from said history to identify said particular site or IO comprises at least one of the following actions:
  identifying sites or IOs that are consistently returned in the same position in the search results for an associated previous query; or
  identifying sites or IOs that receive similar treatment by the search engine during crawling, indexing, or pre-processing operations; or
  identifying sites or IOs that receive similar treatment by the search engine at search time.

16. A computer-implemented process for providing personalized navigation for one or more individuals' use of a search engine, comprising:
  using a computer to perform the following process actions:

identifying if a query submitted to the search engine is a personal navigational query (PNQ) using system-dependent measures of query similarity to identify said query, wherein a PNQ comprises a query designed to navigate to a particular site that was previously viewed by the individual or individuals or an information object (IO) that was previously viewed by the individual or individuals; and whenever said query is identified to be a PNQ,
identifying the particular site or IO associated with said query, said identifying comprises at least one of,
using syntactic or semantic measures of site or IO similarity with sites or IOs used during associated queries from said history to identify said particular site or IO, or
using system-dependent measures of site or IO similarity with sites or lOs used during associated queries from said history to identify said particular site or IO; and
personalizing results of the search based on knowledge of the identified site or IO.

17. The process of claim 16, wherein,
the process action of using system-dependent measures of query similarity to identify said query comprises at least one of the following actions:
identifying a particular query whose search results rank higher than the same search results that were visited via the first query in a PNQ pair submitted to the search engine; or
identifying a query where the individuals explicitly tell the search engine to map said query to a particular site or IO; or
identifying a query having keywords which refer to static text content within the particular site or IO;

the process action of using syntactic or semantic measures of site or IO similarity with sites or IOs used during associated queries from said history to identify said particular site or IO comprises an action of identifying sites or IOs having substantial overlap in their associated information links with one or more previous sites or IOs related to associated previous queries;

the process action of identifying the particular site or IO associated with said query, further comprises a process action of using behavioral measures of site or IO similarity with sites or IOs used during associated queries from said history to identify said particular site or IO, said using behavioral measures comprises at least one of the following actions:
identifying sites or IOs that the individuals interacted with in previous sessions that included an associated previous query or queries; or
identifying sites or IOs that are informed by the individuals' post-click browsing patterns in a personal navigational trail; and the process action of using system-dependent measures of site or IO similarity with sites or IOs used during associated queries from said history to identify said particular site or IO comprises at least one of the following actions:
identifying sites or IOs that are consistently returned in the same position in the search results for an associated previous query; or
identifying sites or IOs that receive similar treatment by the search engine during crawling, indexing, or pre-processing operations; or
identifying sites or IOs that receive similar treatment by the search engine at search time.

* * * * *